United States Patent [19]
Romi

[11] Patent Number: 5,326,198
[45] Date of Patent: Jul. 5, 1994

[54] MICROMETRIC DEVICE FOR FINISHING BORES

[75] Inventor: Giordano Romi, Sta.Bárbara d'Oeste-SP, Brazil

[73] Assignee: Industrias Romi S/A, Brazil

[21] Appl. No.: 57,704

[22] Filed: May 4, 1993

[30] Foreign Application Priority Data
Oct. 8, 1992 [BR] Brazil ............................ PI 9204015

[51] Int. Cl.$^5$ ............................................. B23B 51/00
[52] U.S. Cl. ...................................... 408/161; 408/57; 408/153
[58] Field of Search ..................... 408/56, 57, 59, 61, 408/153, 158, 161, 168, 169, 171

[56] References Cited
U.S. PATENT DOCUMENTS
4,621,548 11/1986 Kubo et al. ...................... 408/161
5,222,846 6/1993 Komi ................................ 408/161

*Primary Examiner*—Daniel W. Howell
*Attorney, Agent, or Firm*—Steinberg, Raskin & Davidson

[57] ABSTRACT

The invention relates to an improved micrometric device for finishing bores of the type having a substantially cylindrical body in the interior of which are mounted displacement devices that actuate on a tool holder displaceable in the same direction as the radial component of the work force. The displacement devices are provided with a backlash suppression system and a movement transmission mechanism. The movement transmission mechanism is provided with a graduated drum coaxially mounted to a micrometric screw. The micrometric screw is axially and radially supported in relation to the body of the micrometric device by a support system. In accordance with the invention, on an upper threaded extension of micrometric screw, a cylindrical rod is mounted that incorporates at its upper end, an oblique portion or extension set off by an angle in relation to the longitudinal axis of micrometric screw. The oblique extension is lodged in a hole of a crossbeam which is displaced on guideways and balls such that a radial displacement of the tool holder is possible.

15 Claims, 10 Drawing Sheets

MICROMETRIC DEVICE FOR FINISHING BORES

BACKGROUND OF THE INVENTION

The present invention relates to an improved micrometric device for finishing bores and particularly to an improvement, introduced on high precision micrometric devices for finishing through and/or blind bores.

Micrometric devices for use with conventional and numerical controlled machine tools for finishing bores are known. However, the micrometric device for finishing bores according to the present invention incorporates important features not found in devices known in the present state of the art.

OBJECTS AND SUMMARY OF THE INVENTION

It is an object of the improved micrometric device for finishing bores of the present invention to provide steps toward a constructive concept in which the dimensional reduction of such a device is taken into consideration in order to minimize the overhang of the tool. As a consequence of the construction, the rigidity of the device is increased particularly when it rotates at high speeds of operation.

Another object of the present invention is to provide an improved micrometric device for finishing bores that displays a more simplified construction, when compared with the construction of existing micrometric devices, but does not cause any kind of impairment to the precision level attainable with the device.

The new and improved device of the present invention includes features which are considered as characteristics for the invention.

The invention itself, however, both as to its construction and its method of operation, together with additional objects and advantages thereof, will be best understood from the following description of specific embodiments when read in connection with the accompanying drawings.

Briefly, the improved micrometric device for finishing bores of the present invention includes a substantially cylindrical body having an interior in which a micrometric screw is arranged. The micrometric screw has an axis of rotation and a threaded extension. Displacement means are provided for displacing a tool holder on which the cutting tool is arranged. The displacement means include both a backlash suppression system and movement transmission means. The movement transmission means are preferably a graduated drum arranged coaxially to the micrometric screw, and support means for axially and radially supporting the micrometric screw in relation to the cylindrical body. A cylindrical rod is arranged in the body around the threaded extension of the micrometric screw and has an oblique portion or extension at an upper end thereof. The oblique extension is inclined at an angle of inclination in relation to an axis of the cylindrical rod. A movable crossbeam, on which the tool holder is mounted, is arranged such that the oblique extension of the cylindrical rod is slidably lodged therein. As a result, movement of the micrometric screw in the direction of its axis of rotation causes the tool holder to be displaced in a perpendicular direction to the axis of rotation of the micrometric screw.

The backlash suppression system comprises a screw lodged in a horizontal thread hole arranged in a side surface of the movable crossbeam, a spring arranged in the threaded hole, and a trapezoid-shaped wedge also arranged in the hole. The screw acts on the spring to press the wedge against a side wall of the oblique extension to suppress any mechanical backlash of the oblique extension.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Referring to FIGS. 1 to 9 and in accordance with the present invention, improved micrometric device 100 for finishing bores comprises a cutting tool 102 clamped directly on at tool holder 101. In this position, the cutting tool 102 can finish large bores or bores as small as the smallest diameter of a rod extension 102a that holds the cutting tool 102. The rod extension 102a is clamped on a tool holder 101a as more clearly shown in FIG. 8.

The improved micrometric device for finishing bores of the present invention is useful for finishing both through and blind bores.

Figure 2:
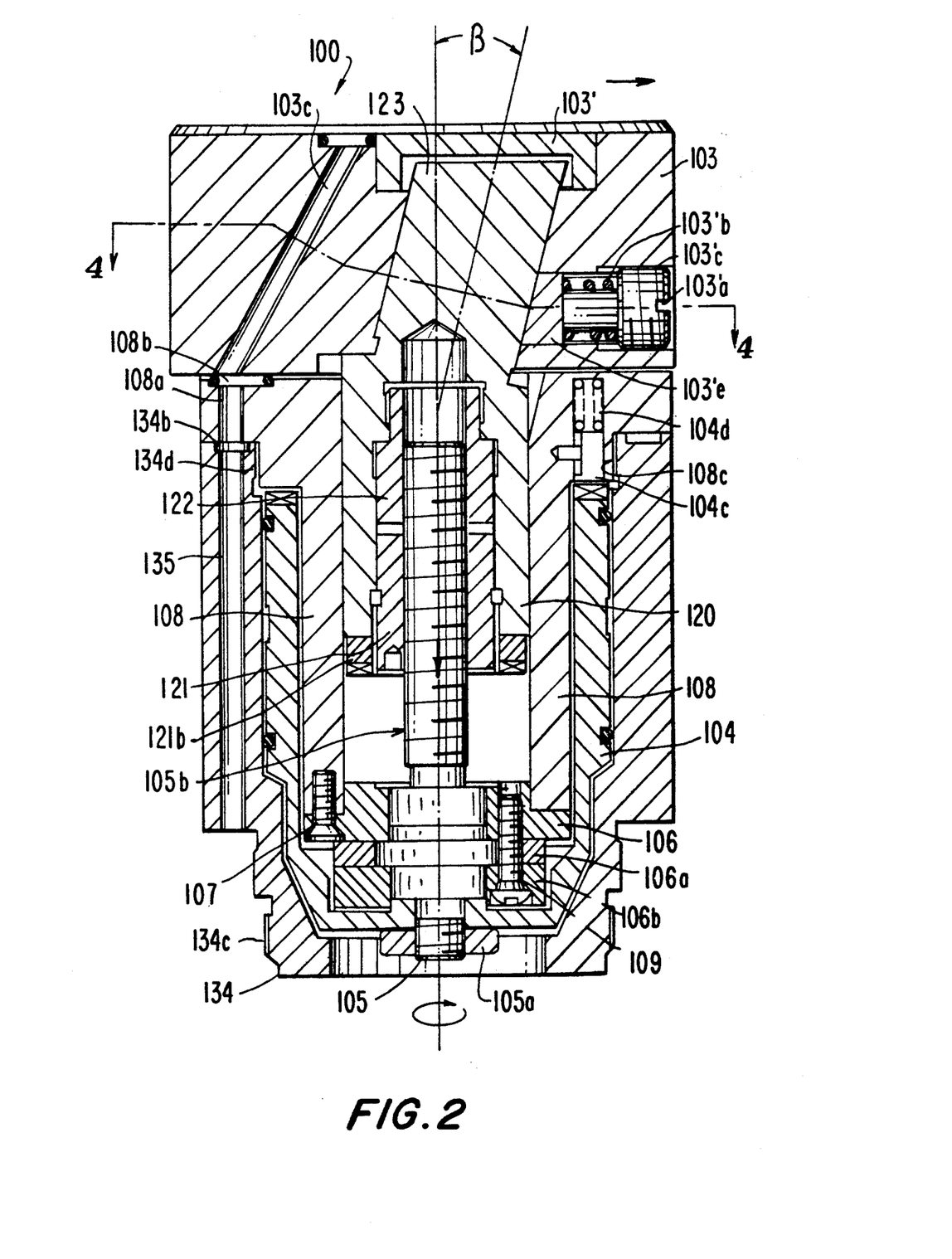
FIG. 2 is a longitudinal section of the improved micrometric device for finishing bores taken along line 2—2 of FIG. 1, showing the elements for converting a rotating movement of a micrometric screw into a longitudinal linear movement of a cylindrical rod which in turn converts itself into a linear movement perpendicular to a cross-bar that is used for holders of the tool.
Figure 2A:
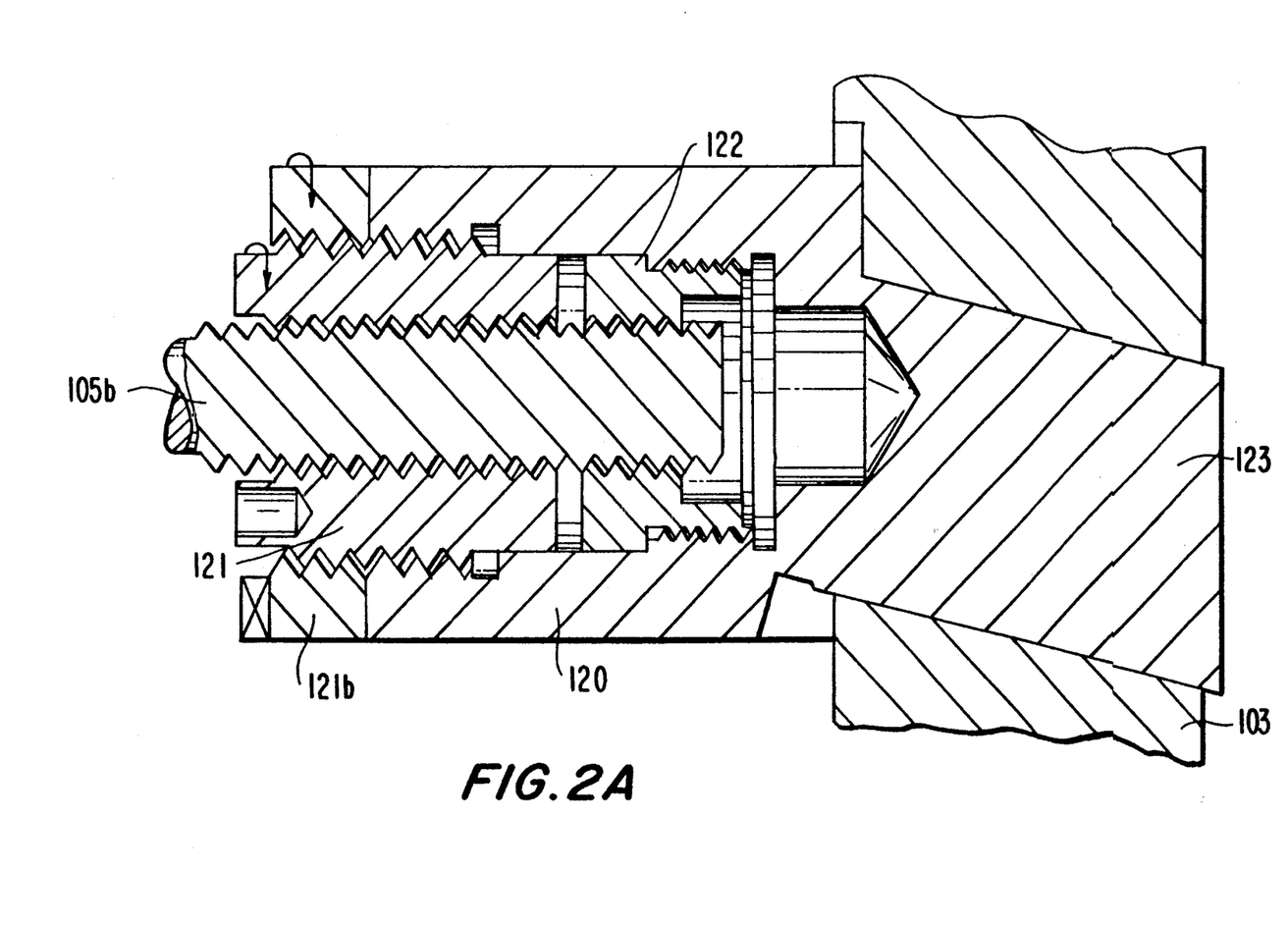
FIG. 2a is an enlarged schematic detail of the micrometric device shown in FIG. 2, illustrating a portion of the mechanical elements for converting rotating movement into linear movement longitudinal and perpendicular to the geometric axis of the micrometric screw.

From the outset, the concept of active and passive thread flanks of screws, internal and/or external threaded bushings, and other mechanical threaded elements should be taken into consideration and defined. The term "active flank" of a thread denotes a flank of a thread that interacts with one of the flanks of another thread such that the two flanks are kept in contact with each other. The term "passive flank" of a thread denotes the flank of a thread that is opposite and adjacent to a corresponding active flank. Between two such passive flanks, there is clearance. FIG. 2a accurately shows the condition and construction of active and passive flanks as explained above.

Improved micrometric device 100 is provided with a movement transmission mechanism, i.e. movement transmission means, consisting of a graduated drum 104 coaxially and jointly mounted around a micrometric screw 105. In this manner, rotation of drum 104 is possible and results in the rotation of micrometric screw 105.

Figure 1:
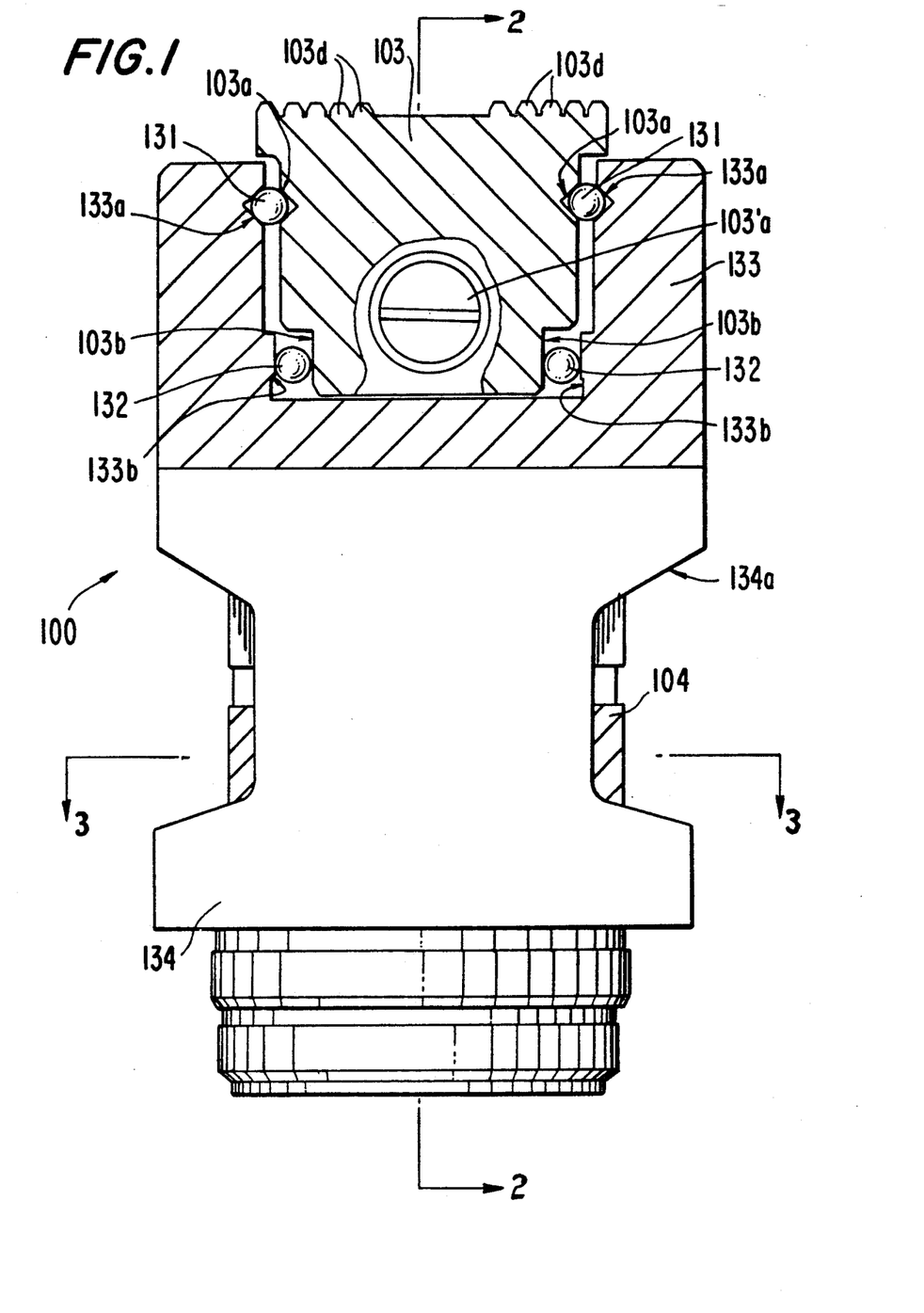
FIG. 1 is a plant view of the improved micrometric device for finishing bores, with the tool removed, in accordance with the present invention.
Figure 3:
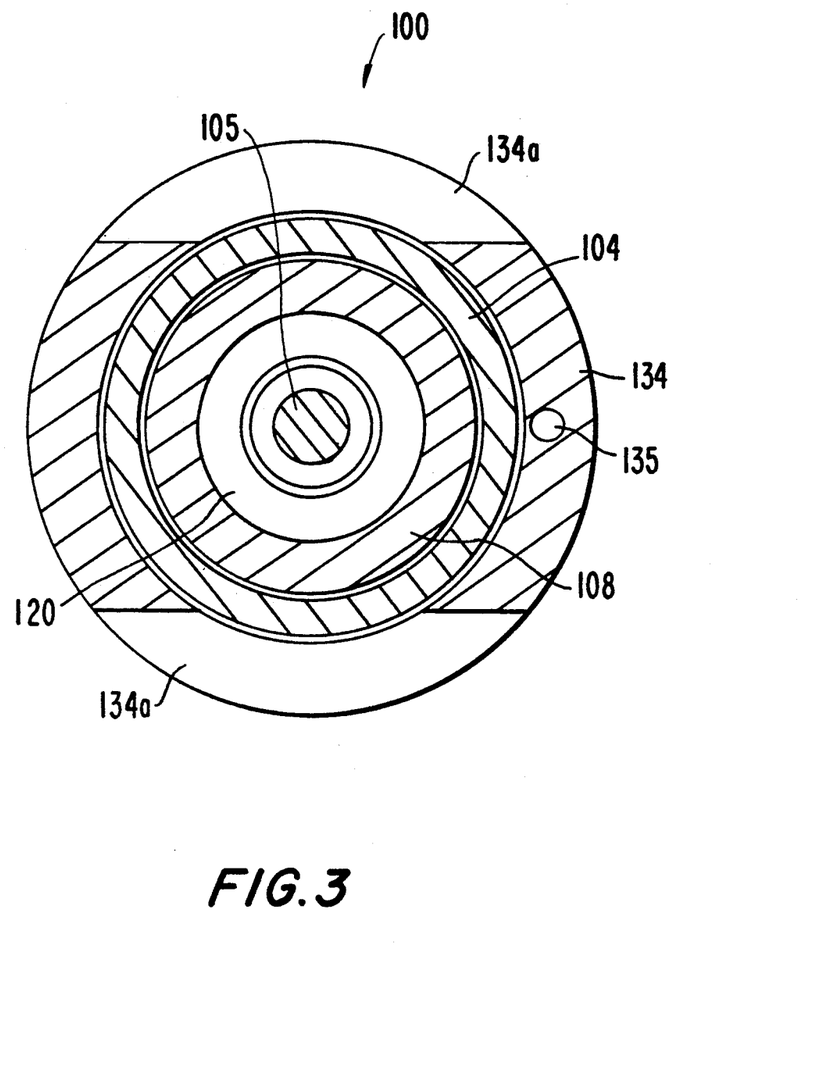
FIG. 3 is a cross sectional view of the device in accordance with the present invention, taken along line 3—3 of FIG. 1.

Micrometric screw 105 is axially maintained and radially supported in relation to the body of the micrometric device 100 through a support system comprising a plurality of rings 106, 106a and 106b, which are held together by fastening screws 109. The support system itself is held together by fastening screws 107 to an internal body 108 which is substantially cylindrical and hollow as shown in FIG. 2. Cylinder body member 108 is held together and coaxially held by an external thread 108c to an external complementary cylindrical body 134 provided with an internal thread 134d. The complementary cylinder 134, graduated drum 104 and cylinder 108 constitute a single assembly coaxially mounted around micrometric screw 105, as shown in FIGS. 1, 2 and 3.

At an extreme bottom of the micrometric screw 105, a nut 105a is provided for holding the graduated drum 104 close to the micrometric screw 105. At the upper extension of the micrometric screw 105 and inside cylindrical body 108, a thread 105b is provided that coaxially trespasses through a lower bushing 121 and an upper bushing 122. Both of these bushings 121,122 are provided with internal and external threads which in turn trespass coaxially through a cylindrical rod 120 which is slidable lodged inside a coaxial hole of the internal cylindrical body 108. The cylindrical rod 102 is also preferably provided with a thread portion which engages the external threads of both the lower bushing 121 and upper bushing 122. A threaded locking ring 121b is provided to prevent the lower bushing 121 from being moved after it has been adjusted for zero backlash.

The cylindrical rod 120, together with the lower bushing 121 and the upper bushing 122, comprise a single assembly coaxially mounted around the upper portion, or extension, of the micrometric screw 105 and arranged inside the internal cylindrical body 108 as shown in FIG. 2. Cylindrical rod 120 incorporates, at its uppermost end, an oblique portion or extension 123 whose geometric axis is off-set at an angle $\beta$ in relation to a geometric axis of micrometric screw 105. In this manner, a rotating movement of the graduated drum 104 is transmitted to the micrometric screw 105 and then converted into a linear movement of the cylindrical rod 120 in the axial direction of the rod 120. In turn, the linear movement of the cylindrical rod 120 cause the Oblique extension 123 to displace a movable crossbeam 103 arranged perpendicular to a geometric axis of the micrometric screw 105 thus making possible a radial displacement of tool holders 101 or 101a.

During the conversion of the rotating movement of the graduated drum 104, and closely connected micrometric screw 105, into a linear movement of the cylindrical rod 120, it is of substantial importance to consider the resolution of micrometric screw 105. The resolution of the micrometric screw 105 is defined as being equal to the smallest possible displacement of the cylindrical rod 120. This displacement is equal to the quotient of the division of the thread pitch of micrometric screw 105 by the number of lines (divisions) of graduated drum 104.

The radial displacement of the movable crossbeam 103 is caused by a longitudinal displacement of the oblique extension 123 of the cylindrical rod 120. The measurement of the radial displacement of the crossbeam 103 is a function of the resolution of the micrometric screw 105 and also of the tangent of angle $\beta$ where tan $\beta$ is the radial displacement of movable crossbeam 103/longitudinal displacement of extension 123.

Figure 6:
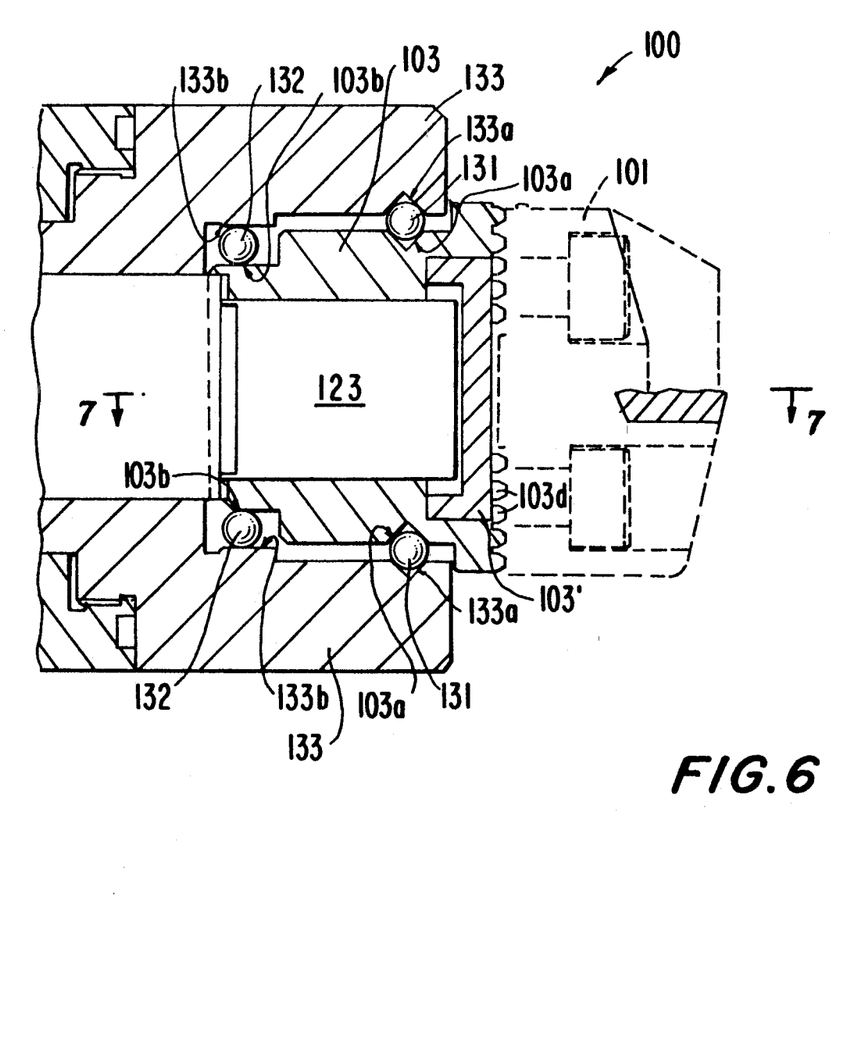
FIG. 6 is a partial longitudinal section of the upper portion of the micrometric device in accordance with the invention showing the support mounting of the cutting tool.

As can be seen in FIGS. 1, 2 and 6, the movable crossbeam 103 operates as a support base for tool holder 101 and moves on an upper portion of the micrometric device 100. The movement of the crossbeam 103 is guided by horizontal "V" shape cuts or grooves 103a and 133a, provided on the upper external walls of the movable crossbeam 103 and on the upper internal portion of the upper portion 133 of the micrometric device 100, respectively. In these grooves, balls 131 and 132 are arranged between plane guideways formed by lower external lateral edges 103b of the movable crossbeam 103 and plane guideways formed by lower internal lateral edges 133b of the upper portion 133 of the body of the improved micrometric device 100, respectively. This provides that the displacement of the movable crossbeam 103, in a direction perpendicular to the geometric axis of the micrometric screw 105, and in relation to the upper body 133, is achieved substantially without backlash and with only minimum friction.

The horizontal "V" shaped guideway that lodges balls 131, as well as the plane guideway that lodges balls 132, extend parallel and at a distance from each other in the direction of a perpendicular plane and pass through the geometric axis of micrometric screw 105. The axis of the micrometric screw 105 is preferably coaxial to the axis of micrometric device 100. This arrangement of the guideways provides for a displacement of the movable crossbeam 103 in a perpendicular direction to the geometric axis of micrometric screw 105. As a result, tool holder 101 or 101a is displaced in a radial direction of micrometric device 100.

FIGS. 1 and 6 also illustrate that balls 131 and 132 are held in a substantially trapezoid perimeter in which the vertex is the center of the balls. This arrangement makes possible a maximum stability of the movable crossbeam 103 and insures against any tendency of rotation in relation to a perpendicular plane to the guideways that lodge the balls.

As shown in FIGS. 2, 5a, 5b, and 5c, a free end of graduated drum 104 is provided with a plurality of teeth 104a and empty spaces 104b on which at least one pair of locating pins 104c actuate. A free end of each of the pins 104c is compelled to be engaged either in the empty space 104b between any of two teeth 104a, or over the crest of any of the teeth 104a.

From the above description, and the illustrations in FIGS. 2, 5a, 5b, and 5c, the action of springs 104d on pins 104c serves to establish a condition of resilient pressure in order that pins 104c actuate and exert an effective function as locators for the graduated drum 104.

As can be seen in FIGS. 1 and 3, manual access to the drum 104 is achieved through side openings 134a arranged on the external complementary cylindrical body 134. This arrangement permits a manual rotation of the graduated drum 104. Rotation of drum 104 can also be made through several non-manual external means (not shown). In these cases, a drum which is suitable for receiving movement from the external actuating means is used.

Figure 7:
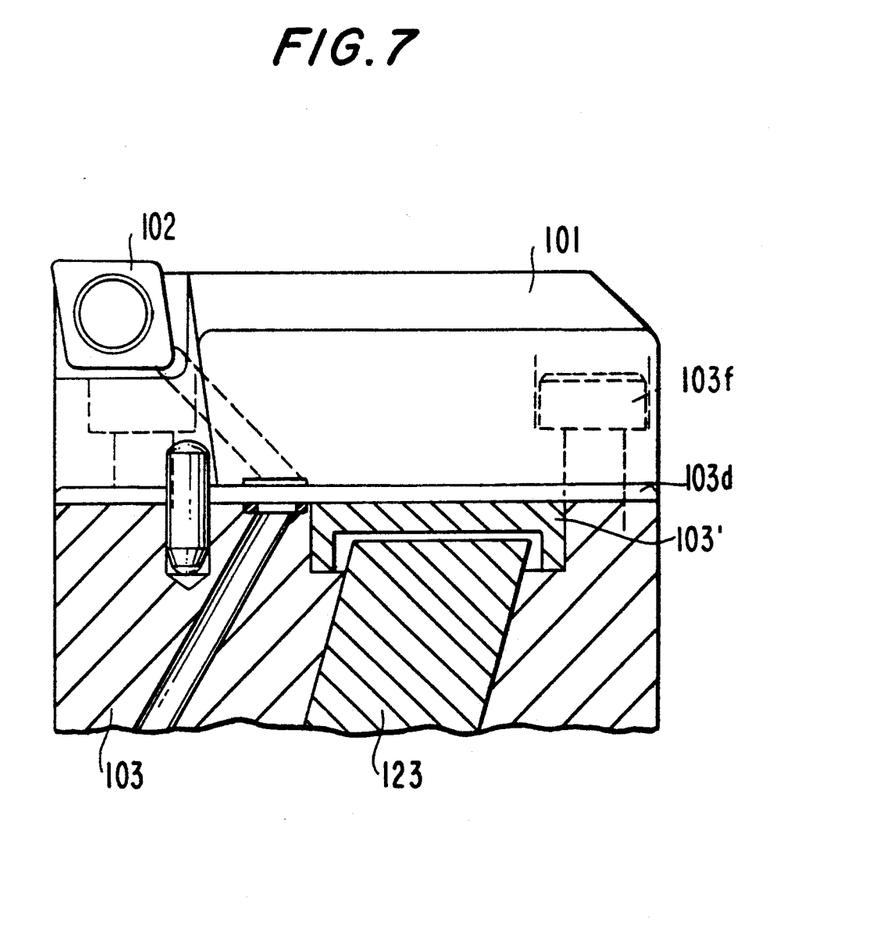
FIG. 7 is a longitudinal section of the front portion of the improved micrometric device in accordance with the invention for finishing bores, taken along line 7—7 of FIG. 6.
Figure 8:
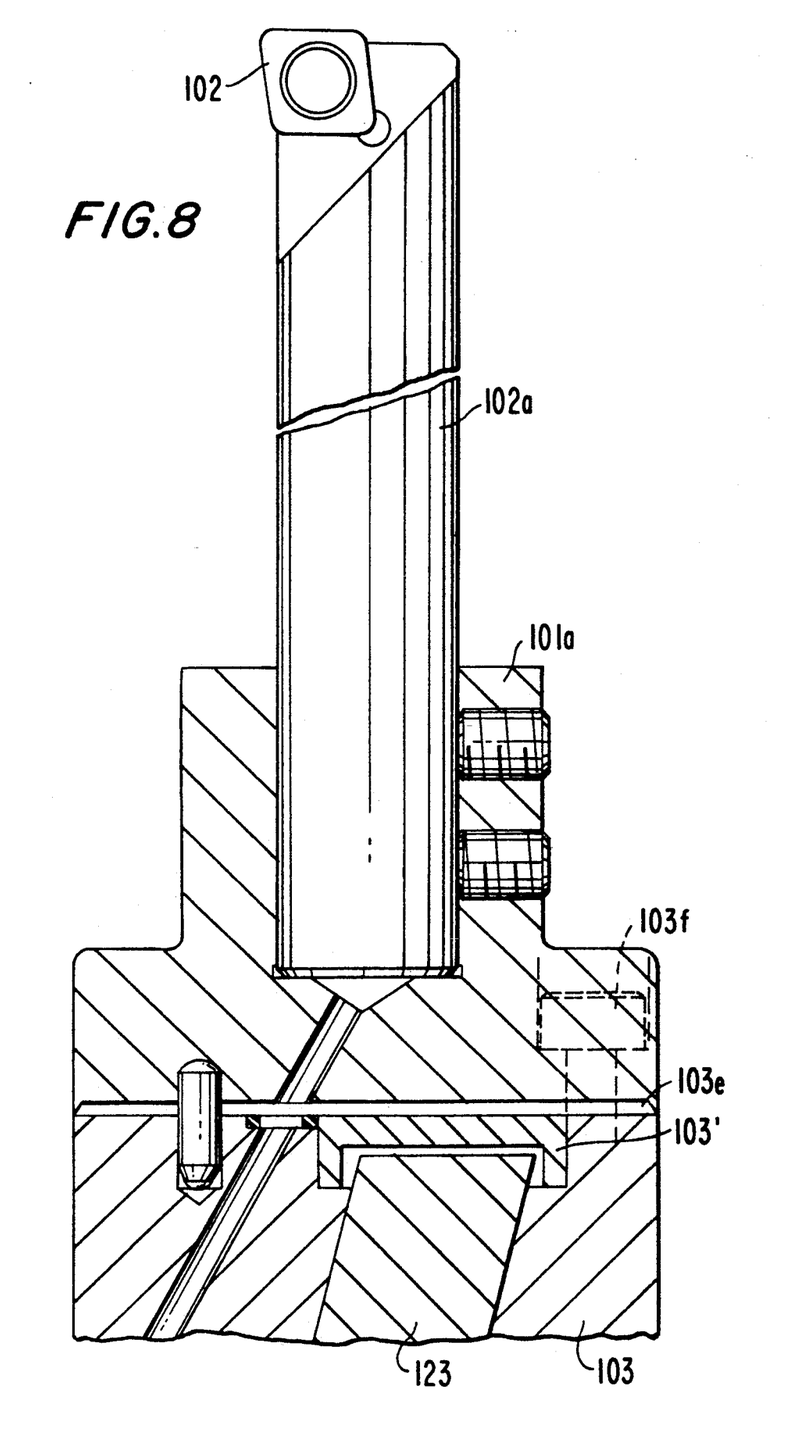
FIG. 8 is an enlarged longitudinal section of the front portion of the improved micrometric device for finishing bores in accordance with the invention, with another type of tool holder, taken along the same line 7—7 of FIG. 6.
Figure 9:
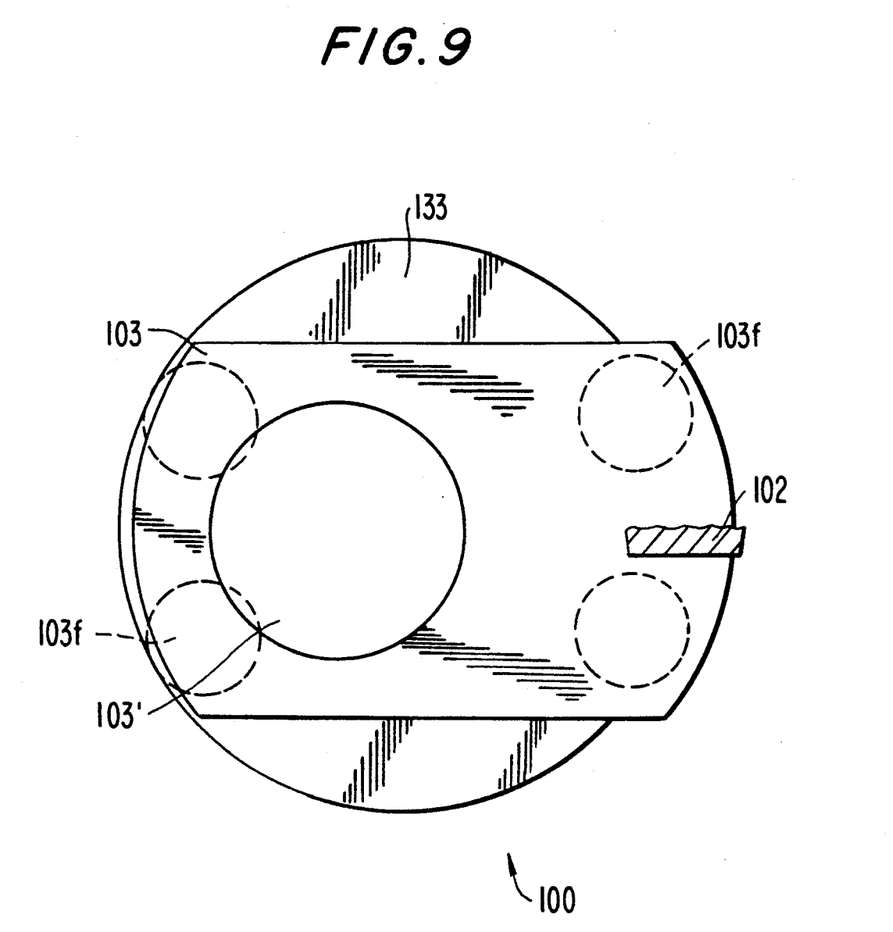
FIG. 9 is a front view of the improved micrometric device for finishing bores in accordance with the invention, taken along arrow E of FIG. 6.

The clamping of tool holders 101 and 101a on the movable crossbeam 103 is by juxtaposition of an indented portion 103d existing at the upper surface of moveable crossbeam 103, and at indented portions which are present respectively at the lower portion of tool holders 101 and 101a. This clamping is accomplished through screws 103f as shown in FIGS. 7, 8 and 9.

Figure 4:
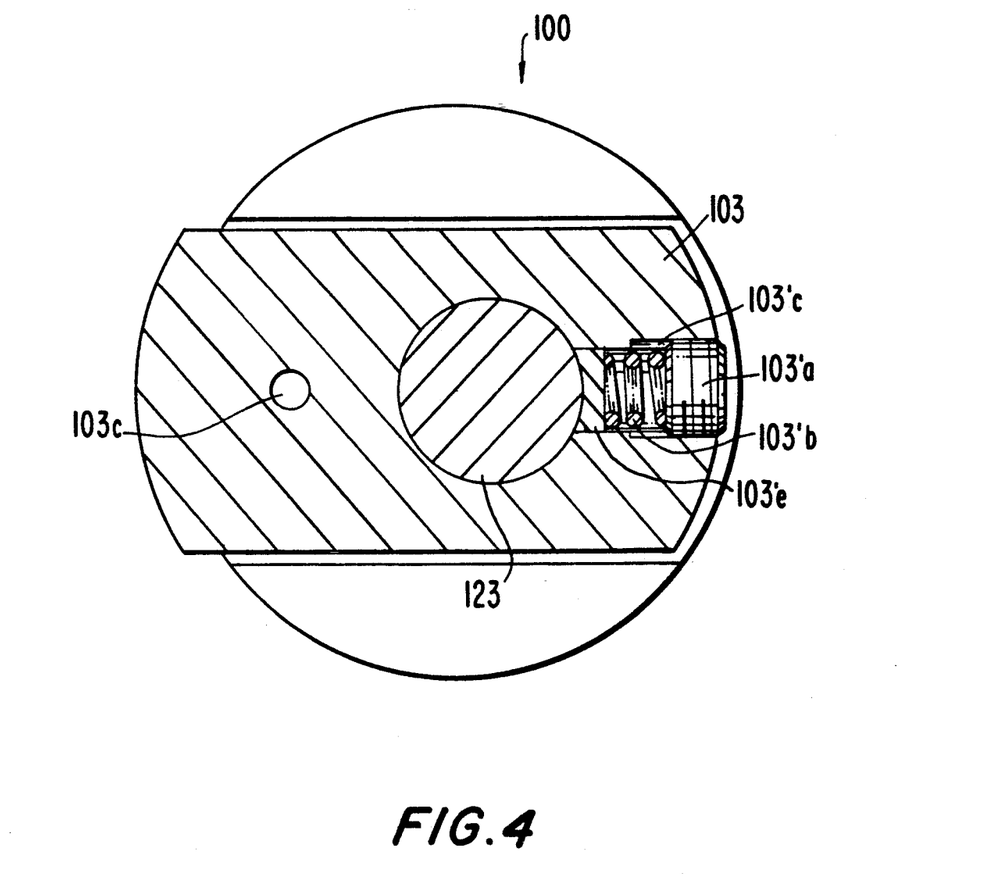
FIG. 4 is a sectional view of the improved micrometric device for finishing bores, taken along line 4—4 of FIG. 2.
Figure 5A:
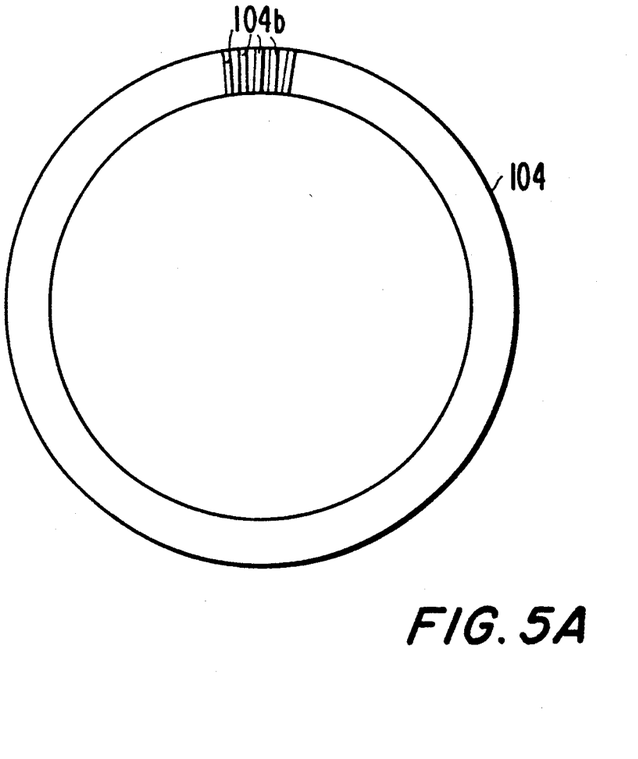
FIG. 5a is a front view from a circular face of the free end of the graduated drum, showing a plurality of teeth uniformly displayed around the circular face and converging to its center in a line in a device in accordance with the present invention.
Figure 5B:
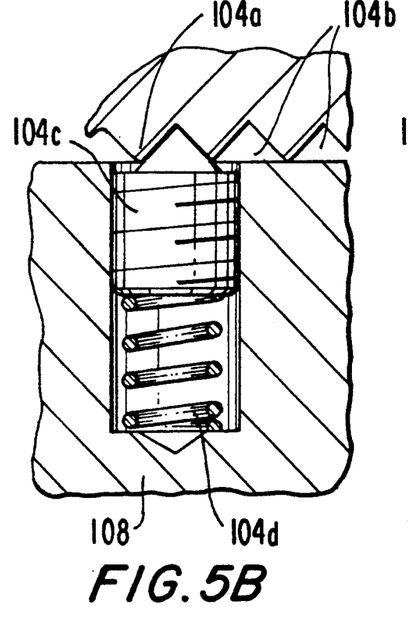
FIGS. 5b and 5c are enlarged schematic and partially cut longitudinal section of the free end of a graduated drum, showing two locating pins in a device in accordance with the present invention.
Figure 5C:
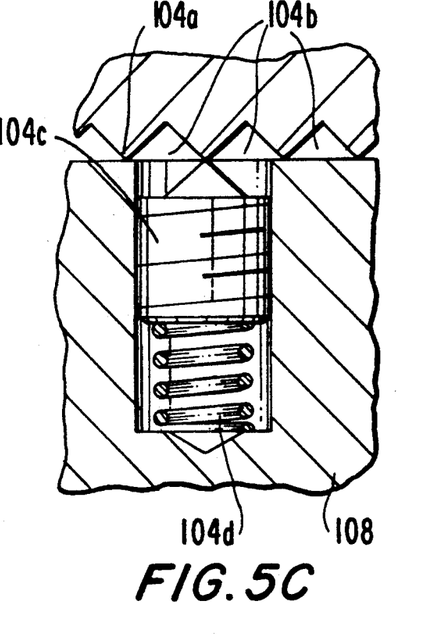

Referring to FIGS. 2 and 4, the movable crossbeam 103 is provided with a threaded hole 103'c arranged perpendicular to the geometric axis of micrometric device 100. The hole 103'c lodges a screw 103'a which exerts pressure on a spring 103'b which in turn compresses a wedge 103'e. The compression of wedge 103'e causes compression of the cylindrical surface of the extension 123. In this manner, any backlash that may exist between the cylindrical rod 120 and the cylindrical body 108 and/or between the movable crossbeam 103 and the extension 123 is suppressed.

Inside the cylindrical wall of the complementary external body 134 of the improved micrometric device 100 for finishing bores, a cooling duct 135 is provided. The cooling duct 135 is arranged longitudinal to the external body 134 and ends at a circular chamber 134b provided on top of the upper end of external body 134. The circular chamber 134b communicates with a cooling duct 103c provided on the movable crossbeam 103 through a hole 108a connected to a circular recess 108b orthogonally provided on the peripheral edge of internal cylindrical body 108 of micrometric device 100 as shown in FIG. 2.

In this arrangement, the cooling duct 135, the chamber 134b and ducts 108a, 108b and 103c and those ducts existing on tool holders 101 and 101a(shown with dotted lines in FIGS. 7 and 8), provide an effective cooling of the cutting tool 102 during the machining operation assuming the proper cooling fluid is conducted through the ducts and chambers.

The diameter of the circular recess 108b is slightly larger than the total cross displacement of the movable crossbeam 103 so that there is always a communication, i.e. connection, for the cutting fluid to flow between the lower portion of the cylindrical body 108 and the movable crossbeam 103 that supports tool holders 101 and 101aand respective cutting tool 102.

A disc type cover 103' is adjusted in the upper face of the crossbeam 103 and prevents metal and liquid impurities from entering into the space occupied by the oblique extension 123 in order to avoid any possible damage to the elements of the invention.

The examples provided above are not meant to be exclusive. Many other variations of the present invention would be obvious to those skilled in the art, and are contemplated to be within the scope of the appended claims.

I claim:
1. An improved micrometric device for finishing bores, comprising
   a substantially cylindrical body having an interior,
   a micrometric screw arranged in said interior, said micrometric screw having an axis of rotation and a threaded extension,
   displacement means for displacing a tool holder on which a cutting tool is arranged, said displacement means comprising a backlash suppression system and movement transmission means,
   said movement transmission means comprising a graduated drum arranged coaxially to said micrometric screw, and support means for axially and radially supporting said micrometric screw in relation to said body, said transmission means further comprising a cylindrical rod arranged in said body around said threaded extension of said micrometric screw, said cylindrical rod having an oblique portion or extension at an upper end thereof, said oblique extension being inclined at an angle of inclination in relation to an axis of said cylindrical rod, said movement transmission means further comprising a movable crossbeam on which the tool holder is mounted, said oblique extension being slidably lodged in said movable crossbeam such that movement of said micrometric screw in the direction of its axis of rotation causes the tool holder to be displaced in a perpendicular direction to the axis of rotation of said micrometric screw.

2. The device of claim 1, further comprising a lower bushing and an upper bushing arranged in said body between said cylindrical rod and said threaded extension of said micrometric screw, said lower and upper bushing being provided with internal and external threads to engage said threaded extension of said micrometric screw.

3. The device of claim 2, wherein said cylindrical rod, said lower bushing and said upper bushing constitute a single assembly coaxially mounted around said threaded extension, the external threads of said lower and upper bushings engaging with threads arranged on said cylindrical rod.

4. The device of claim 3, wherein a rotation of said graduated drum causes a longitudinal displacement of said assembly comprising said lower bushing, said upper bushing and said cylindrical rod, the resolution of said micrometric screw being equal to the smallest possible displacement of said assembly and being determined by the quotient of the division of the thread pitch of said threaded portion of said micrometric screw by the number of lines of said graduated drum.

5. The device of claim 4, wherein the ratio of the displacement of said movable crossbeam in relation to the displacement of said cylindrical rod and said oblique extension is determined by the angle of inclination between the axis of said cylindrical rod and a geometric axis of said oblique extension together with the resolution of said micrometric screw.

6. The device of claim 5, further comprising
   horizontal V-shaped guideways arranged on said movable crossbeam and on an upper portion of said micrometric device, and
   a first series of balls lodged between said horizontal guideways, the angle of inclination of said oblique extension being within a plane that extends parallel to said horizontal guideways, said horizontal guideways extending in a perpendicular direction to the geometric axis of said micrometric screw.

7. The device of claim 6, wherein said horizontal guideways comprise cuts or grooves provided in upper external walls of said movable crossbeam and in upper internal walls of said upper portion of micrometric device, said movable crossbeam being guided by said horizontal guideways.

8. The device of claim 7, further comprising
plane guideways arranged in lower external lateral edges of said movable crossbeam in lower internal lateral edges of said upper portion of said micrometric device, and
a second series of balls arranged between said plane guideways, said first and second series of balls causing said movable crossbeam to be displaced in a direction perpendicular to a geometric axis of said micrometric screw coaxial to a geometric axis of said micrometric device.

9. The device of claim 8, wherein said horizontal guideways are arranged parallel to and at a distance from said plane guideways such that said first and second series of balls are contained in a substantially trapezoid perimeter whose vertices are the center lines of said first and second series of balls.

10. The device of claim 1, wherein said cylindrical body is provided with side openings such that said graduated drum is manually accessible and manually rotatable.

11. The device of claim 10, wherein said graduated drum is structured and arranged to receive movement from external actuating means.

12. The device of claim 1, wherein said movable crossbeam is provided with indented portions on an upper surface thereof such that the tool holder is arranged on said movable crossbeam by aligning said indented portions on said movable crossbeam with indented portions provided on a lower portion of the tool holder, the tool holder being firmly clamped to said movable crossbeam by means of screws.

13. The device of claim 12, wherein said backlash suppression system comprises
a screw lodged in a horizontal thread hole arranged in a side surface of said movable crossbeam,
a spring arranged in said threaded hole, and
a trapezoid-shaped wedge arranged in said threaded hole, said screw acting on said spring to press said wedge against a side wall of said oblique extension to suppress any mechanical backlash of said oblique extension.

14. The device of claim 1, further comprising
a first cooling duct extending longitudinally along a wall of said body in the interior thereof, said body having a circular recess provided on a peripheral edge thereof, and
a second cooling duct provided in said movable crossbeam,
said first cooling duct connecting to a circular chamber arranged at an end of said first cooling duct in said body, said circular chamber connecting to an aperture of said circular recess such that said first cooling duct in said body connects with said second cooling duct in said movable crossbeam.

15. The device of claim 14, wherein the diameter of said circular recess is slightly larger than the length of the maximum displacement of said movable crossbeam along said horizontal and plane guideways such that cooling fluid flows through said first cooling duct in said body to and from said second cooling duct in said movable crossbeam.

* * * * *